United States Patent
Horst et al.

(10) Patent No.: US 12,295,505 B2
(45) Date of Patent: May 13, 2025

(54) CHILD BASSINET AND CHILD CARE APPARATUS INCLUDING A CHILD BASSINET INSTALLED ON A PLAYPEN

(71) Applicant: Wonderland Switzerland AG, Steinhausen (CH)

(72) Inventors: Andrew J. Horst, West Lawn, PA (US); Curtis M. Hartenstine, Birdsboro, PA (US); Patrick J. Bowers, Hockessin, DE (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/113,498

(22) Filed: Feb. 23, 2023

(65) Prior Publication Data

US 2023/0200557 A1      Jun. 29, 2023

Related U.S. Application Data

(62) Division of application No. 17/073,283, filed on Oct. 16, 2020, now Pat. No. 11,607,057, which is a
(Continued)

(51) Int. Cl.
*A47D 9/00*       (2006.01)
*A47D 7/00*       (2006.01)
(Continued)

(52) U.S. Cl.
CPC ............ *A47D 9/005* (2013.01); *A47D 7/007* (2013.01); *A47D 9/016* (2022.08); *A47D 11/007* (2013.01);
(Continued)

(58) Field of Classification Search
CPC .......... F16B 12/40; F16B 12/56; A47D 9/016; A47D 9/008; A47D 9/005; A47D 13/06;
(Continued)

(56) References Cited

U.S. PATENT DOCUMENTS

| 949,389 A | 2/1910 | Almgren |
| 2,507,060 A | 5/1950 | Oliver |

(Continued)

FOREIGN PATENT DOCUMENTS

| CN | 2337866 Y | 9/1999 |
| CN | 1749631 A | 3/2006 |

(Continued)

OTHER PUBLICATIONS

Apr. 27, 2018 Office Action from co-pending DE Patent Application No. 10 2018 100 556.3, and accompanying English summary of same.

(Continued)

*Primary Examiner* — Justin C Mikowski
*Assistant Examiner* — Ifeolu A Adeboyejo
(74) *Attorney, Agent, or Firm* — Volpe Koenig

(57) ABSTRACT

A child bassinet includes a support frame supporting an enclosure, and a playpen coupling mechanism provided on the support frame. The playpen coupling mechanism includes an adjustable catching part that is connected with the support frame and is engageable with a playpen for installing the child bassinet thereon. The catching part is movable relative to the support frame between a first and a second position of different elevations, and is further movable relative to the support frame between a locked state where the catching part engages with the support frame for locking the catching part in the first or second position, and an unlocked state where the catching part is disengaged from the support frame for movement of the catching part between the first and second position. The catching part is adjustable between the first and second position for installing the child bassinet on the playpen at different heights.

15 Claims, 17 Drawing Sheets

Related U.S. Application Data division of application No. 15/868,910, filed on Jan. 11, 2018, now Pat. No. 10,874,225.

(60) Provisional application No. 62/599,320, filed on Dec. 15, 2017, provisional application No. 62/489,850, filed on Apr. 25, 2017, provisional application No. 62/444,924, filed on Jan. 11, 2017.

(51) Int. Cl.

| | |
|---|---|
| *A47D 11/00* | (2006.01) |
| *A47D 13/06* | (2006.01) |
| *A47D 15/00* | (2006.01) |
| *F16B 12/40* | (2006.01) |
| *F16B 12/44* | (2006.01) |
| *F16B 12/56* | (2006.01) |

(52) U.S. Cl.
CPC ............. *A47D 13/06* (2013.01); *A47D 15/00* (2013.01); *F16B 12/40* (2013.01); *F16B 12/44* (2013.01); *F16B 12/56* (2013.01)

(58) Field of Classification Search
CPC ...... A47D 11/007; A47D 7/005; A47D 7/007; A47D 7/04
See application file for complete search history.

(56) References Cited

U.S. PATENT DOCUMENTS

| | | | |
|---|---|---|---|
| 2,586,237 A | 2/1952 | Samuel | |
| 2,617,119 A | 11/1952 | Samuel | |
| 2,629,109 A | 2/1953 | Goldberg | |
| 2,772,423 A | 12/1956 | Samuel | |
| 3,135,970 A * | 6/1964 | Trent | A47D 3/005 |
| | | | 5/2.1 |
| 4,124,906 A | 11/1978 | Millard et al. | |
| 4,483,026 A | 11/1984 | Kassai | |
| 5,155,880 A | 10/1992 | Schoonover et al. | |
| 5,339,470 A | 8/1994 | Shamie | |
| 5,349,709 A * | 9/1994 | Cheng | A47D 7/04 |
| | | | 5/93.1 |
| 5,553,336 A | 9/1996 | Mariol | |
| 5,615,427 A * | 4/1997 | Huang | A47D 13/063 |
| | | | 5/98.1 |
| 5,845,349 A * | 12/1998 | Tharalson | A47D 11/00 |
| | | | 5/99.1 |
| 5,991,944 A | 11/1999 | Yang | |
| 6,192,535 B1 | 2/2001 | Warner, Jr. et al. | |
| 6,470,515 B1 | 10/2002 | Hsia | |
| 6,550,082 B2 | 4/2003 | Tharalson et al. | |
| 7,013,505 B2 | 3/2006 | Martin | |
| 7,818,832 B2 | 10/2010 | Hartenstine et al. | |
| 8,011,036 B2 | 9/2011 | Tuckey | |
| 8,656,530 B2 * | 2/2014 | You | A47D 7/03 |
| | | | 5/98.1 |
| 8,997,277 B2 | 4/2015 | Thomas et al. | |
| 9,066,607 B1 * | 6/2015 | Ransil | A47D 15/00 |
| 9,364,098 B2 | 6/2016 | Flore, III et al. | |
| 9,675,182 B2 * | 6/2017 | Longenecker | A47D 9/016 |
| 11,019,938 B2 | 6/2021 | Taylor et al. | |
| 12,070,134 B2 | 8/2024 | Tuckey | |
| 2002/0083524 A1 | 7/2002 | Tharalson et al. | |
| 2003/0177575 A1 | 9/2003 | Cheng et al. | |
| 2009/0049605 A1 | 2/2009 | Zhao et al. | |
| 2009/0113624 A1 | 5/2009 | Tuckey | |
| 2009/0113625 A1 * | 5/2009 | Hutchinson | A47D 13/06 |
| | | | 5/93.1 |
| 2010/0162484 A1 | 7/2010 | Thomas et al. | |
| 2012/0036634 A1 | 2/2012 | Pacella | |
| 2014/0047639 A1 | 2/2014 | Cheng | |
| 2014/0259393 A1 | 9/2014 | Clute et al. | |
| 2014/0283298 A1 | 9/2014 | Cheng | |
| 2023/0043971 A1 | 2/2023 | Pacella | |

FOREIGN PATENT DOCUMENTS

| | | |
|---|---|---|
| CN | 201208098 Y | 3/2009 |
| CN | 100508834 C | 7/2009 |
| CN | 201528886 U | 7/2010 |
| CN | 101862091 A | 10/2010 |
| CN | 201822384 U | 5/2011 |
| CN | 102396926 A | 4/2012 |
| CN | 104367038 A | 2/2015 |
| CN | 110916435 A | 3/2020 |
| CN | 115500654 A | 12/2022 |
| DE | 29513579 U1 | 11/1995 |
| DE | 20000537 U1 | 8/2000 |
| DE | 202007008992 U1 | 11/2007 |
| EP | 0692209 A1 | 1/1996 |
| EP | 2359719 A1 | 8/2011 |
| EP | 2820977 A1 | 1/2015 |
| GB | 180522 A | 6/1922 |
| GB | 2337698 A | 1/1999 |
| GB | 2425465 A | 1/2006 |
| GB | 2453241 A | 1/2009 |
| RU | 205510 U1 | 7/2021 |

OTHER PUBLICATIONS

Office Action dated Jul. 3, 2018 in co-pending UK Appln. No. 1800468.9.
An Official Action & Further Search Report of the UK Patent Application No. 1800468.9.
"Office Action Issued in Corresponding U.S. Appl. No. 15/868,910", Mailed Date: Mar. 23, 2020, 7 pages.
Official Action issued on Sep. 14, 2020 of the Chinese Patent Application No. 201810026937.4 (with English Summary).
"First Office Action Issued in Corresponding German Patent Application No. 102018200347.5", Mailed Date: Oct. 30, 2018, 4 pages.
"Combined Search and Examination Report Issued in Corresponding UK Patent Application No. GB2211508.3", Mailed Date: Aug. 18, 2022, 5 pages.
"Combined Search and Examination Report Issued in Corresponding UK Patent Application No. GB2200345.3", Mailed Date: Jan. 28, 2022, 5 pages.

* cited by examiner

CHILD BASSINET AND CHILD CARE APPARATUS INCLUDING A CHILD BASSINET INSTALLED ON A PLAYPEN

CROSS-REFERENCE TO RELATED APPLICATION(S)

This application is a divisional application of U.S. non-provisional application Ser. No. 17/073,283 filed on Oct. 16, 2020, which is a divisional application of U.S. non-provisional application Ser. No. 15/868,910 filed on Jan. 11, 2018, now granted as U.S. Pat. No. 10,874,225, which respectively claims priority to U.S. provisional application No. 62/444,924 filed on Jan. 11, 2017, to U.S. provisional application No. 62/489,850 filed on Apr. 25, 2017, and to U.S. provisional application No. 62/599,320 filed on Dec. 15, 2017.

BACKGROUND

1. Field of the Invention

The present invention relates to child bassinets and child care apparatuses including a child bassinet installed on a playpen.

2. Description of the Related Art

Some playpen product available on the market may include a bassinet accessory that can be placed on the playpen to provide an elevated surface for a young infant to sleep or play. The conventional attachment system for the bassinet accessory usually engages with a top portion of the playpen so that the bassinet accessory can be held in a fixed hanging position over a bottom of the playpen. However, the placement of the bassinet accessory on the playpen at only one fixed position may not be suitable for different configurations of use. For example, a higher position of the bassinet accessory may facilitate access to the child received in the bassinet, whereas a lower position of the bassinet accessory may be preferable for improved safety when the child received therein is sleeping.

Therefore, there is a need for an improved child bassinet that can be manufactured in a cost-effective manner, and address at least the foregoing issues.

SUMMARY

The present application describes a child bassinet that can be installed on a playpen. According to an embodiment, the child bassinet includes a support frame supporting an enclosure, the support frame and the enclosure delimiting at least partially an interior space for receiving a child, and a playpen coupling mechanism provided on the support frame and operable to engage with and disengage from a playpen for installation and removal of the child bassinet on the playpen. The playpen coupling mechanism includes an adjustable catching part movably connected with the support frame, the catching part being movable relative to the support frame between a first position and a second position of different elevations, the catching part in the first position being engageable with a playpen for installing the child bassinet on the playpen at a first height above a bottom of the playpen, and the catching part in the second position being engageable with the playpen for installing the child bassinet on the playpen at a second height above the bottom of the playpen that is different from the first height. The catching part is further movable relative to the support frame between a locked state where the catching part engages with the support frame for locking the catching part in the first position or the second position, and an unlocked state where the catching part is disengaged from the support frame for movement of the catching part between the first and second position.

Moreover, the present application provides a child care apparatus comprising a playpen having an upper frame portion, and the child bassinet installable on the upper frame portion of the playpen.

DETAILED DESCRIPTION OF THE EMBODIMENTS

Figure 1:
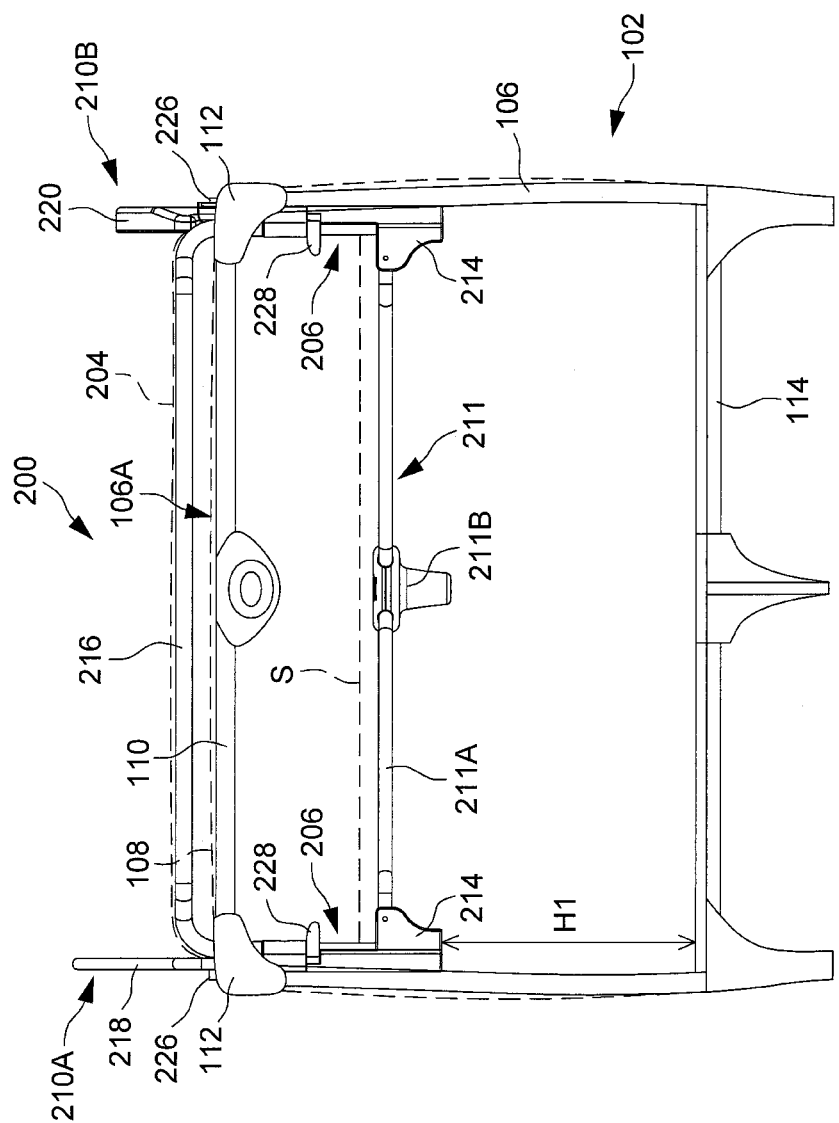
FIG. 1 is a side view illustrating an embodiment of a child care apparatus including a child bassinet installed on a playpen at a first elevated position.
Figure 2:
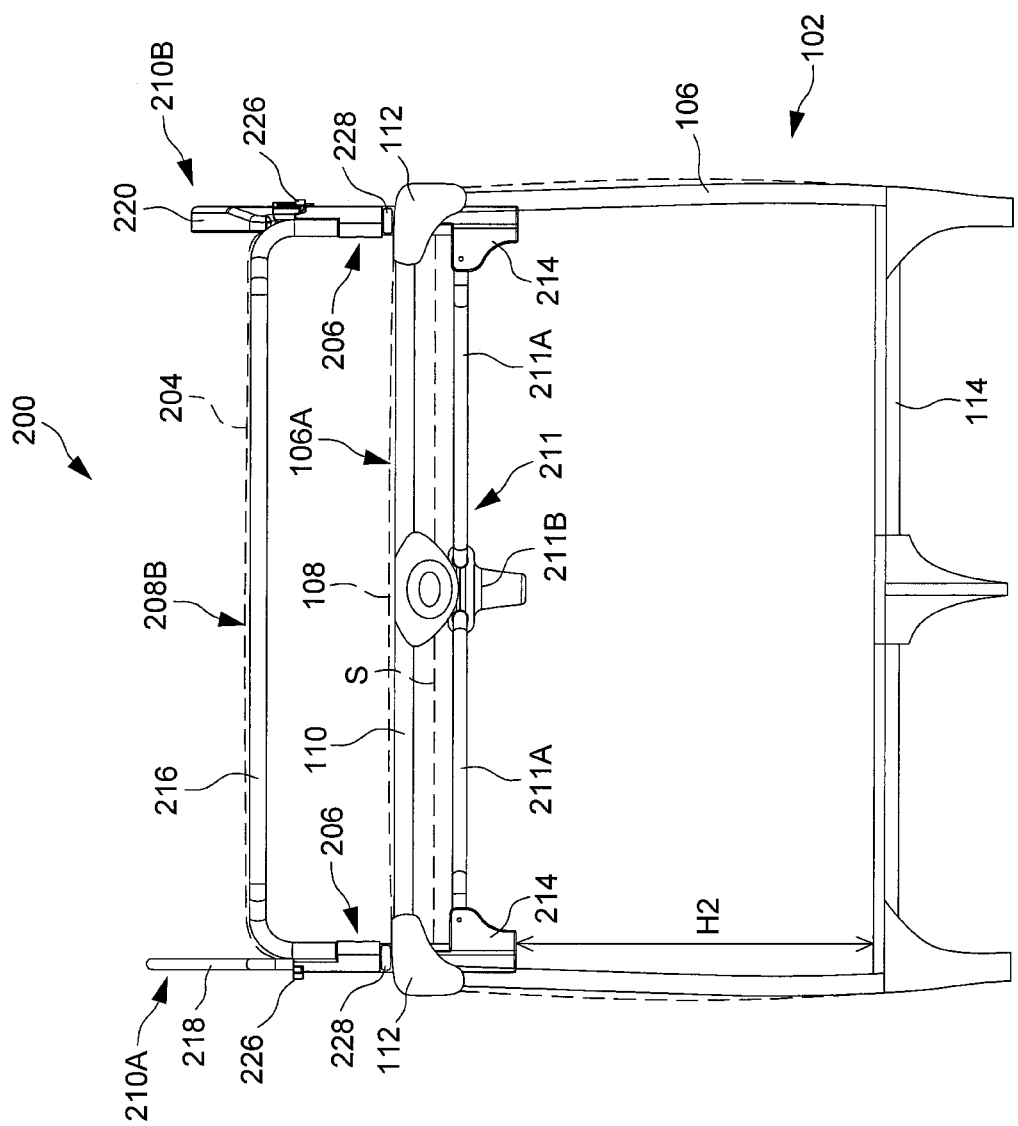
FIG. 2 is a side view illustrating the child care apparatus of FIG. 1 with the child bassinet installed on the playpen at a second elevated position different from the first elevated position.

FIGS. 1 and 2 are schematic side views illustrating an embodiment of a child care apparatus 100. Referring to FIGS. 1 and 2, the child care apparatus 100 can include a playpen 102 and a child bassinet 200. The playpen 102 can include a frame assembly 106, and an enclosure 108 (shown with phantom lines) comprised of a flexible material that can be attached to the frame assembly 106. The frame assembly 106 and the enclosure 108 can at least partially delimit an interior space of the playpen 102 adapted to receive a child. The child bassinet 200 can be installed on an upper frame portion 106A of the playpen 102, and removed from the playpen 102 for use as a standalone device. The upper frame portion 106A of the playpen 102 may include tube segments 110 and corner brackets 112, and can provide support for the child bassinet 200 above a bottom 114 of the playpen 102.

Referring to FIGS. 1 and 2, the child bassinet 200 can be installed on the playpen 102 at different heights above the bottom 114 of the playpen 102. In FIG. 1, the child care apparatus 100 is shown with the child bassinet 200 installed on the upper frame portion 106A of the playpen 102 at a first height H1 above the bottom 114 of the playpen 102. The elevated position of the child bassinet 200 shown in FIG. 1 can be a relatively lower position where a sleeping surface S of the child bassinet 200 (shown with phantom lines) is located below a top of the playpen 102 for increased safety. In FIG. 2, the child care apparatus 100 is shown with the child bassinet 200 installed on the upper frame portion 106A of the playpen 100 at a second height H2 above the bottom 114 of the playpen 102 that is greater than the first height H1. The elevated position of the child bassinet 200 shown in FIG. 2 can be a relatively higher position where the sleeping surface S of the child bassinet 200 can be close to a top of the playpen 102 for facilitating access to the interior of the child bassinet 200. Further construction details of the child bassinet 200 allowing its installation on the playpen 102 at different elevated positions is described hereinafter with further reference to FIGS. 3-5.

Figure 3:
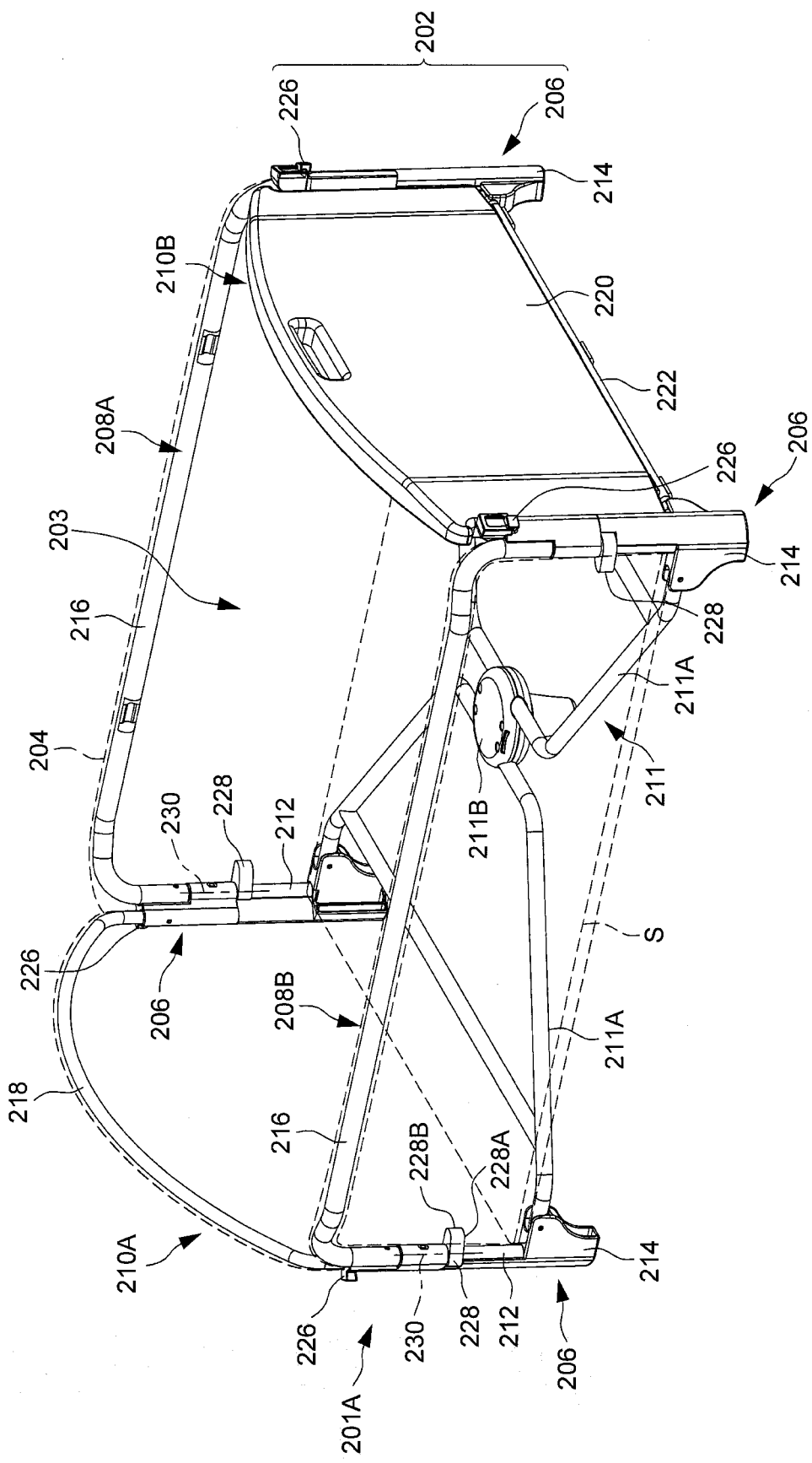
FIG. 3 is a perspective view illustrating the child bassinet of FIG. 1 alone.
Figure 4:
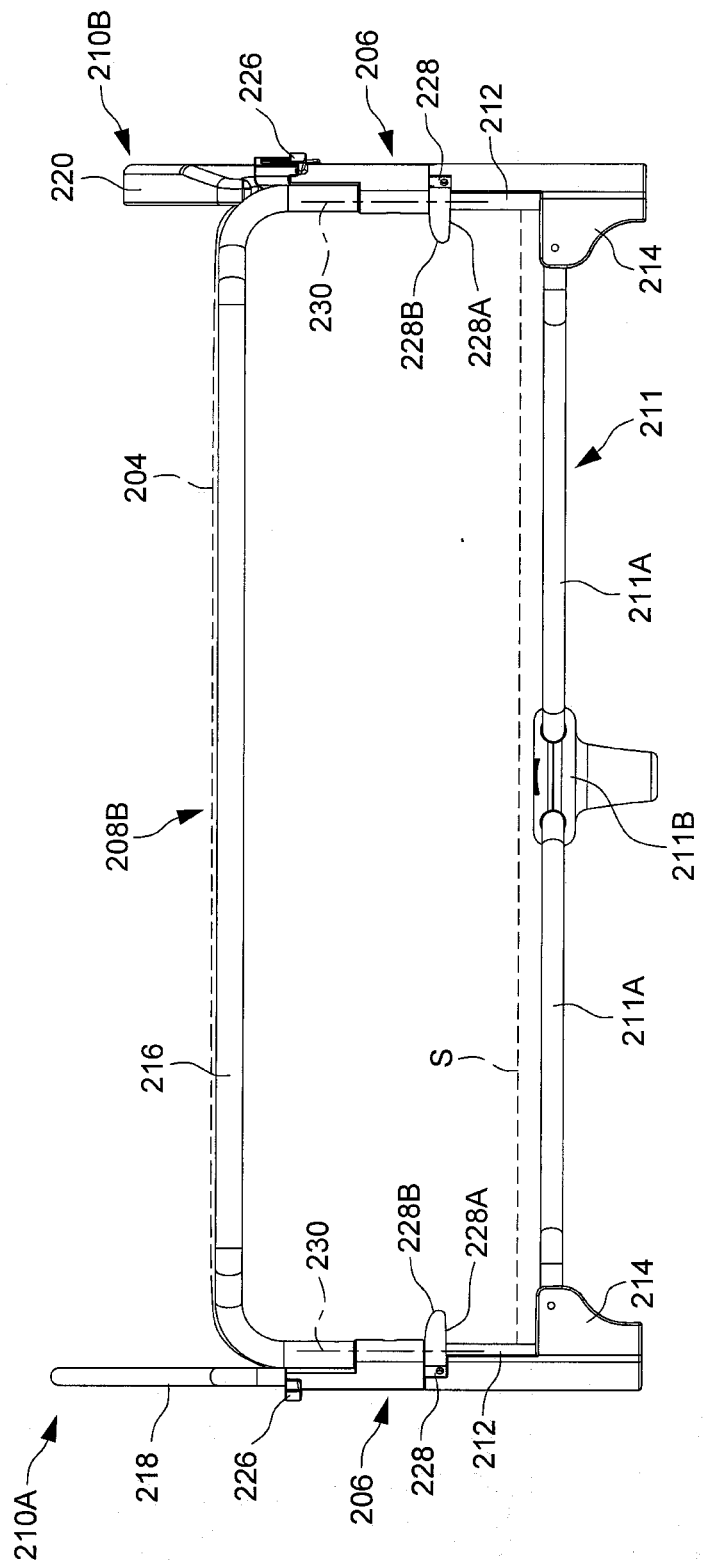
FIG. 4 is a side view of the child bassinet shown in FIG. 3.
Figure 5:
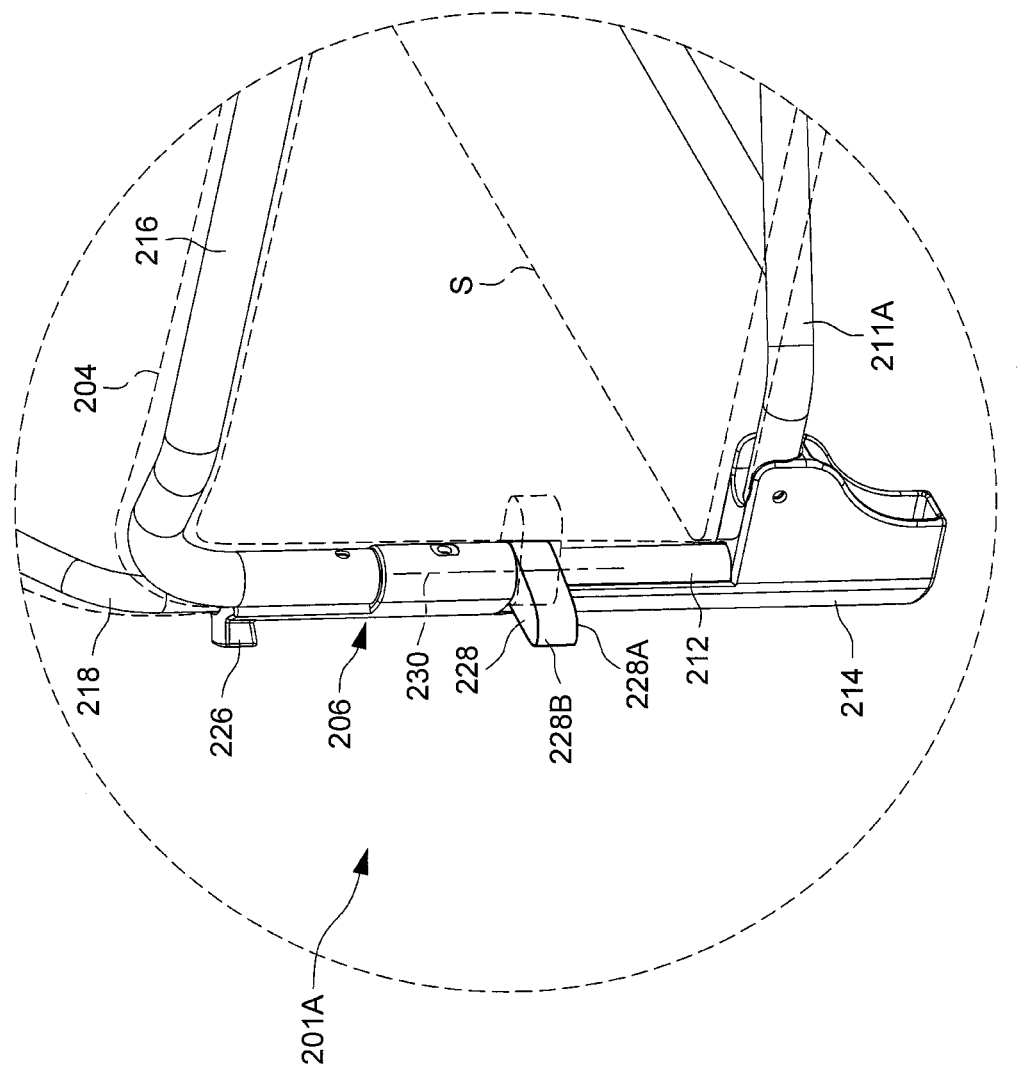
FIG. 5 is an enlarged view illustrating some construction details of a playpen coupling mechanism provided in the child bassinet shown in FIG. 3.

In conjunction with FIGS. 1 and 2, FIG. 3 is a perspective view illustrating the child bassinet 200 alone, FIG. 4 is a side view of the child bassinet 200, and FIG. 5 is an enlarged view illustrating some construction details of the child bassinet 200. Referring to FIGS. 1-5, the child bassinet 200 can include a support frame 202, and an enclosure 204 (shown with phantom lines) comprised of a fabric material that can be attached to the support frame 202. The support frame 202 and the enclosure 204 can delimit at least partially an interior space 203 of the child bassinet 200 for receiving a child. According to an example of construction, the support frame 202 can include a plurality of upright frame portions 206, two opposite side frame portions 208A and 208B, two end frame portions 210A and 210B, and a bottom frame portion 211.

The upright frame portions 206 can be corner frame portions respectively disposed at a plurality of corners of the child bassinet 200. Each upright frame portion 206 can include, e.g., a rigid post 212 fixedly connected with a foot 214 at a lower end thereof. The rigid post 212 can include one or more tube segment.

Each of the two opposite side frame portions 208A and 208B can be respectively connected with two upright frame portions 206, and can exemplary include an elongate tube portion 216.

The end frame portion 210A can include an elongate tube portion 218 that is respectively connected with two upright frame portions 206. The other end frame portion 210B can exemplary include a panel 220 and an elongate bar 222 disposed at a side opposite to that of the end frame portion 210A. The elongate bar 222 can be connected with two upright frame portions 206, and the panel 220 can be pivotally connected with the elongate bar 222. The panel 220 can thereby rotate relative to the elongate bar 222 to open and close the child bassinet 200 for facilitating access to the interior of the child bassinet 200.

The bottom frame portion 211 can be respectively connected pivotally with the feet 214 of the upright frame portions 206, and can provide support for a sleeping surface S of the child bassinet 200. According to an embodiment, the bottom frame portion 211 can have a foldable structure comprised of a plurality of tube segments 211A, and a central pivot joint 211B connected with the tube segments 211A. The foldable structure of the bottom frame portion 211 can facilitate the collapse of the child bassinet 200 to a compact size.

Referring to FIGS. 1-5, the child bassinet 200 can further include a playpen coupling mechanism 201A provided on the support frame 202 for installation of the child bassinet 200 on the playpen 102. More specifically, the playpen coupling mechanism 201A can engage with the playpen 102 when the child bassinet 200 is installed on the playpen 102, and disengage from the playpen 102 when the child bassinet 200 is removed from the playpen 102. According to an embodiment, the playpen coupling mechanism 201A can include a plurality of catching parts 226 and 228 respectively connected with the support frame 202 of the child bassinet 200. When the child bassinet 200 is installed on the playpen 102 in the lower elevated position shown in FIG. 1, the catching parts 226 can respectively engage with the upper frame portion 106A of the playpen 102, while the catching parts 228 can remain disengaged from the playpen 102. When the child bassinet 200 is installed on the playpen 102 in the higher elevated position shown in FIG. 2, the catching parts 228 can respectively engage with the upper frame portion 106A of the playpen 102, and the catching parts 226 can remain disengaged from the playpen 102.

According to an embodiment, the catching parts 226 and 228 can be respectively connected with the upright frame portions 206. More specifically, each upright frame portion 206 can be respectively connected with one catching part 226 and one catching part 228, both the catching parts 226 and 228 being respectively disposed at two vertically spaced-apart locations on the upright frame portion 206. For example, the catching part 228 can be disposed below the catching part 226 on each upright frame portion 206.

Each catching part 226 can be respectively connected fixedly with the corresponding upright frame portion 206. For example, each catching part 226 may be a protrusion that is fixedly attached to the rigid post 212 of the corresponding upright frame portion 206 and protrudes sideways outside the interior space 203 enclosed by the enclosure 204.

Each catching part 228 can be disposed outside the interior space 203 enclosed by the enclosure 204, and can be connected with the corresponding upright frame portion 206 for movement substantially perpendicular to the upright frame portion 206. For example, each catching part 228 may be respectively connected pivotally with the corresponding upright frame portion 206 (e.g., with the rigid post 212 thereof) about a substantially vertical pivot axis 230. The catching part 228 can be formed integrally as a single piece, and can have a downwardly facing surface 228A between the pivot axis 230 and a distal end 228B of the catching part 228. The downwardly facing surface 228A can be in contact with the upper frame portion 106A of the playpen 102 when the catching part 228 is engaged with the upper frame portion 106A of the playpen 102.

Referring to FIGS. 1-5, on each upright frame portion 206, the catching part 228 can rotate about the pivot axis 230 between two positions: a first position where the catching part 228 is positioned adjacent and generally parallel to a sidewall of the enclosure 204 (shown in FIGS. 3 and 4 and also illustrated with phantom lines in FIG. 5), and a second position where the catching part 228 can protrude away from the enclosure 204 (shown with solid lines in FIG. 5). When the catching part 228 on each upright frame portion 206 is in the first position shown in FIGS. 3 and 4, the catching part 228 is in a retracted state close to the enclosure 204 that can disable engagement of the catching part 228 with the upper frame portion 106A of the playpen 102. The catching parts 226 and 228 on each upright frame portion 206 can respectively protrude in two different directions when the catching part 228 is in the first position shown in FIGS. 3 and 4.

When the catching part 228 on each upright frame portion 206 is in the second position shown with solid lines in FIG. 5, the catching part 228 is in a deployed state allowing engagement of the catching part 228 with the upper frame portion 106A of the playpen 102.

For installing the child bassinet 200 on the playpen 102 in the lower elevated position shown in FIG. 1, the catching part 228 on each upright frame portion 206 can be respectively disposed in the retracted position (shown in FIGS. 3 and 4) so as to prevent its engagement with the upper frame portion 106A of the playpen 102. The child bassinet 200 then can be mounted on the playpen 102 with the catching parts 226 resting in contact with the upper frame portion 106A of the playpen 102.

For installing the child bassinet 200 on the playpen 102 in the higher elevated position shown in FIG. 2, the catching part 228 on each upright frame portion 206 can be respectively rotated to the deployed position (shown with solid lines in FIG. 5). The child bassinet 200 then can be mounted on the playpen 102 with the respective downwardly facing surfaces 228A of the catching parts 228 resting in contact with the upper frame portion 106A of the playpen 102.

When the child bassinet 200 is removed from the playpen 102 and used as a standalone device, the catching part 228 on each upright frame portion 206 can be respectively rotated to the retracted position. The feet 214 can provide standing support for the child bassinet 200 when the child bassinet 200 is used as a standalone device.

Although the catching part 228 has been described as being pivotally connected with the upright frame portion 206 for adjustment between the deployed position and the retracted position, it will be appreciated that a sliding connection between the catching part 228 and the upright frame portion 206 may also be suitable. For example, the catching part 228 may be assembled with the upright frame portion 206 for sliding generally perpendicular to the upright frame portion 206 between the deployed position and the retracted position.

Figure 6:
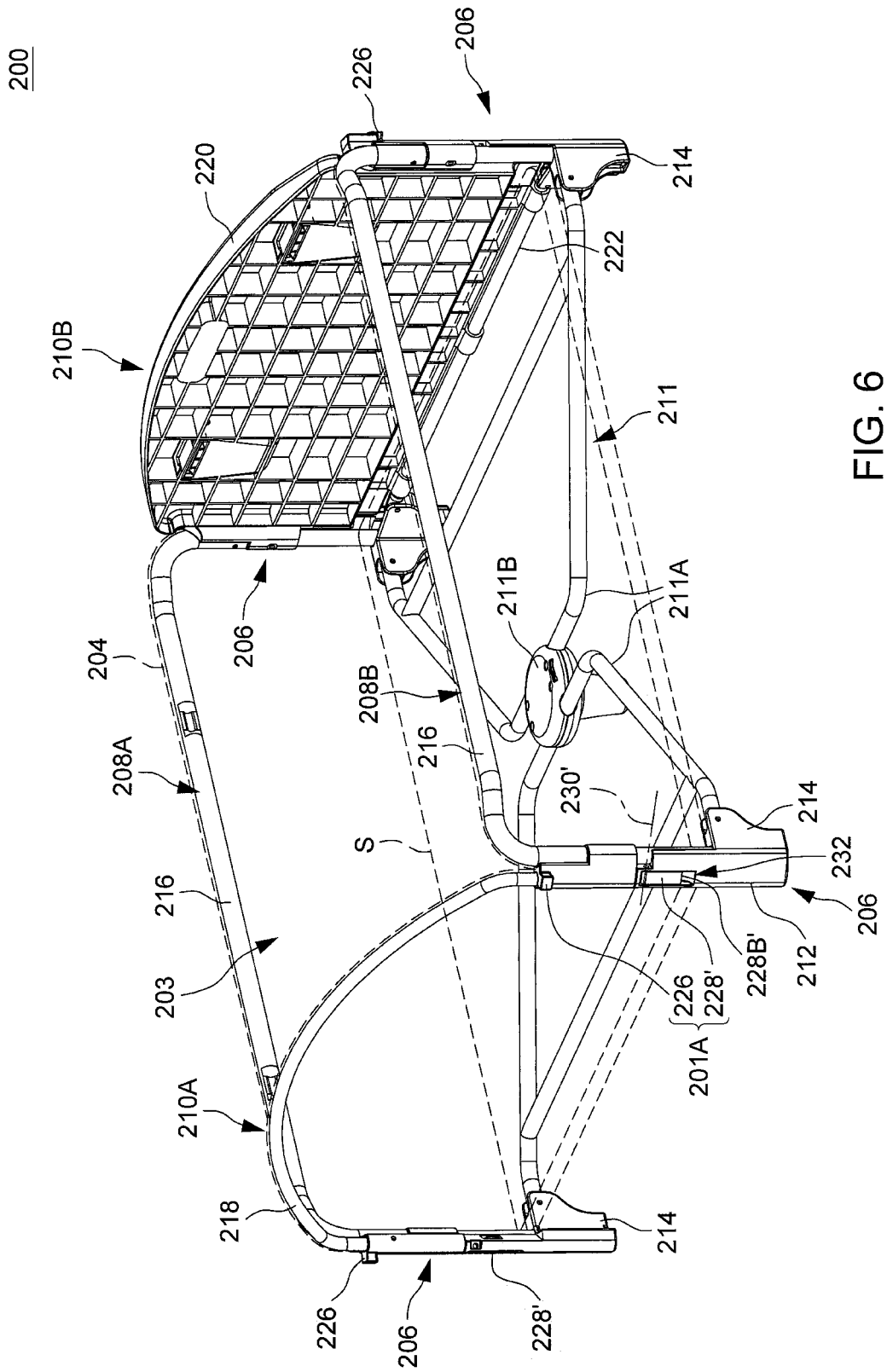
FIG. 6 is a perspective view illustrating a variant construction of a playpen coupling mechanism provided in the child bassinet.
Figure 7:
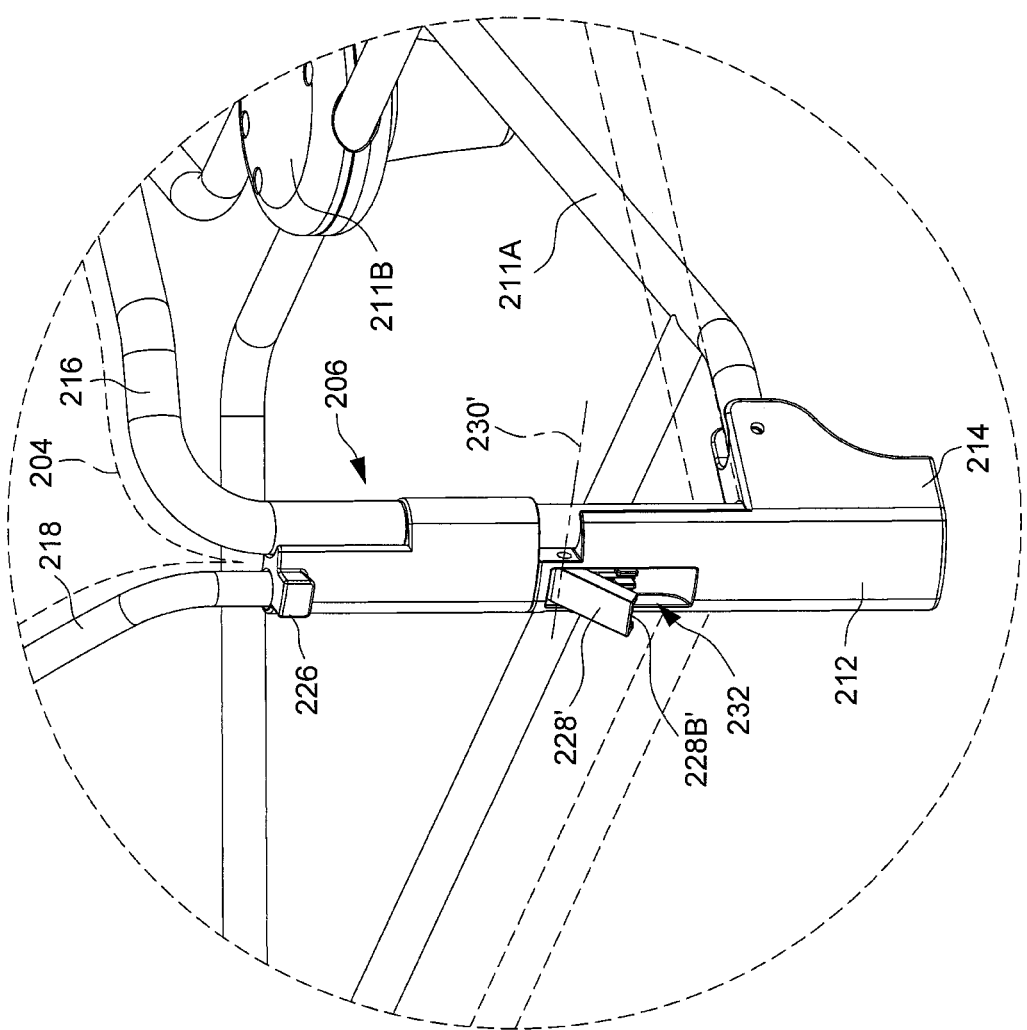
FIG. 7 is an enlarged view illustrating exemplary operation of the playpen coupling mechanism shown in FIG. 6.

FIG. 6 is a perspective view illustrating a variant construction in which the aforementioned catching part 228 provided on each upright frame portion 206 of the child bassinet 200 is respectively replaced with a catching part 228'. FIG. 7 is an enlarged view illustrating exemplary operation of the catching part 228' on one upright frame portion 206. Referring to FIGS. 6 and 7, each catching part 228' can be placed outside the interior space 203 enclosed by the enclosure 204, and can be disposed below the catching part 226. Each catching part 228' can be pivotally connected with the rigid post 212 of the corresponding upright frame portion 206 about a substantially horizontal pivot axis 230', and can have a distal end 228B' distant from the pivot axis 230'. The distal end 228B' can be in contact with the upper frame portion 106A of the playpen 102 when the catching part 228' is engaged with the upper frame portion 106A of the playpen 102.

Referring to FIGS. 6 and 7, on each upright frame portion 206, the catching part 228' can rotate about the pivot axis 230' relative to the upright frame portion 206 between two positions: a first position where the catching part 228' is positioned generally vertically and generally parallel to the upright frame portion 206 (shown in FIG. 6), and a second position where the catching part 228' can protrude away from the upright frame portion 206 (shown in FIG. 7). When the catching part 228' on each upright frame portion 206 is in the first position shown in FIG. 6, the catching part 228' is in a retracted state with the distal end 228B' thereof adjacent to the upright frame portion 206, thereby disabling engagement of the catching part 228' with the upper frame portion 106A of the playpen 102. According to an embodiment, the upright frame portion 206 can include a recess 232, and the distal end 228B' of the catching part 228' can be received in the recess 232 in the first position.

When the catching part 228' on each upright frame portion 206 is in the second position with the distal end 228B' protruding outside the recess 232 (as shown in FIG. 7), the child bassinet 200 may be installed on the playpen 102 with the distal end 228B' of the catching part 228' resting in contact with the upper frame portion 106A of the playpen 102. The catching part 226 and the catching part 228' on each upright frame portion 206 may protrude from the upright frame portion 206 in a same direction when the catching part 228' is in the second position.

For installing the child bassinet 200 on the playpen 102 in the position of a lower elevation, the catching part 228' on each upright frame portion 206 can be respectively disposed in the retracted position shown in FIG. 6 so as to prevent its engagement with the upper frame portion 106A of the playpen 102. The child bassinet 200 then can be mounted on the playpen 102 with the catching parts 226 resting in contact with the upper frame portion 106A of the playpen 102, like previously described.

For installing the child bassinet 200 on the playpen 102 in the position of a higher elevation, the catching part 228' on each upright frame portion 206 can be respectively rotated to the deployed position shown in FIG. 7. The child bassinet 200 then can be mounted on the playpen 102 with the distal end 228B' of the catching parts 228' resting in contact with the upper frame portion 106A of the playpen 102.

Figure 8:
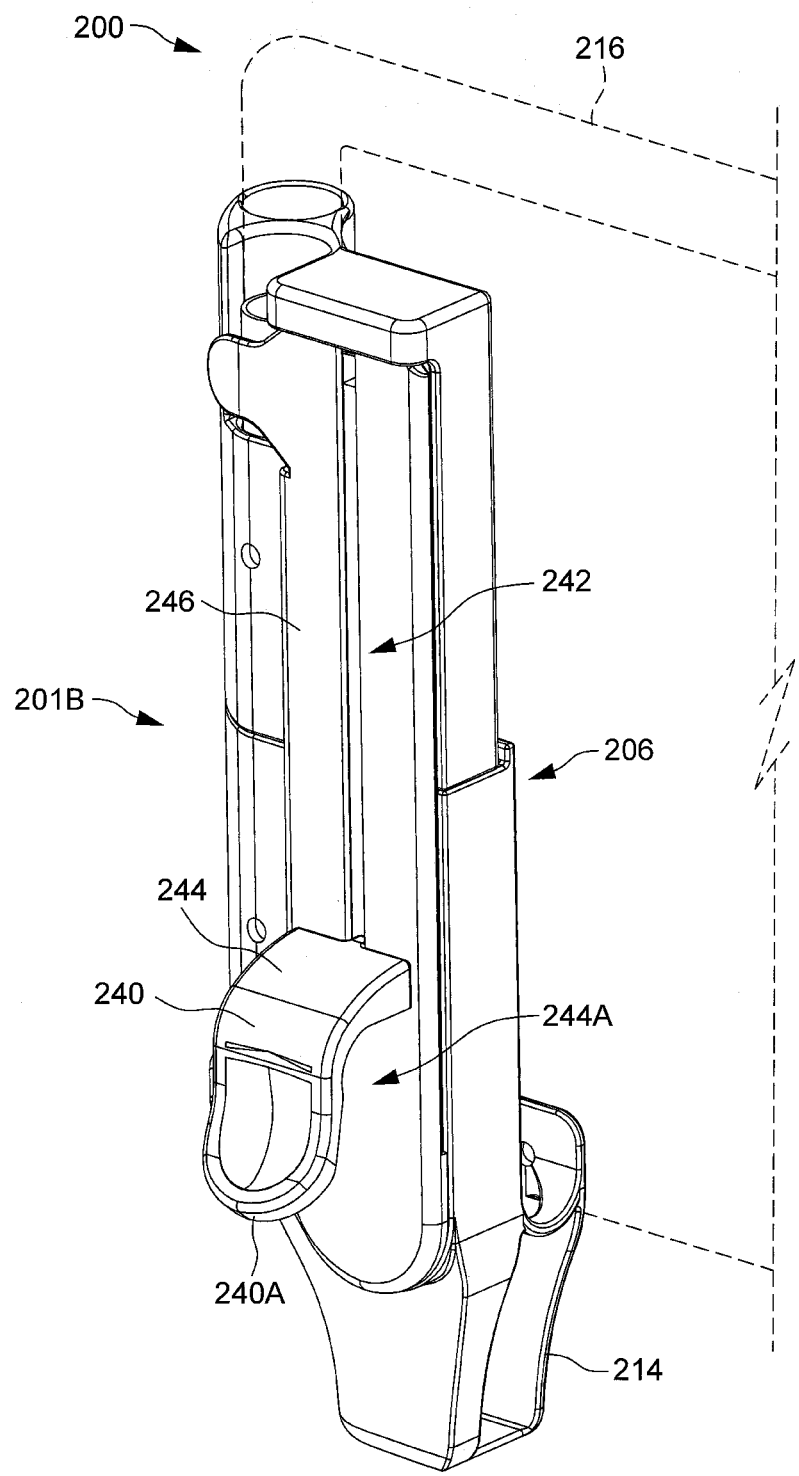
FIG. 8 is a perspective view illustrating another embodiment of a playpen coupling mechanism provided on one upright frame portion of a child bassinet for installation of the child bassinet on a playpen at different elevations.
Figure 9:
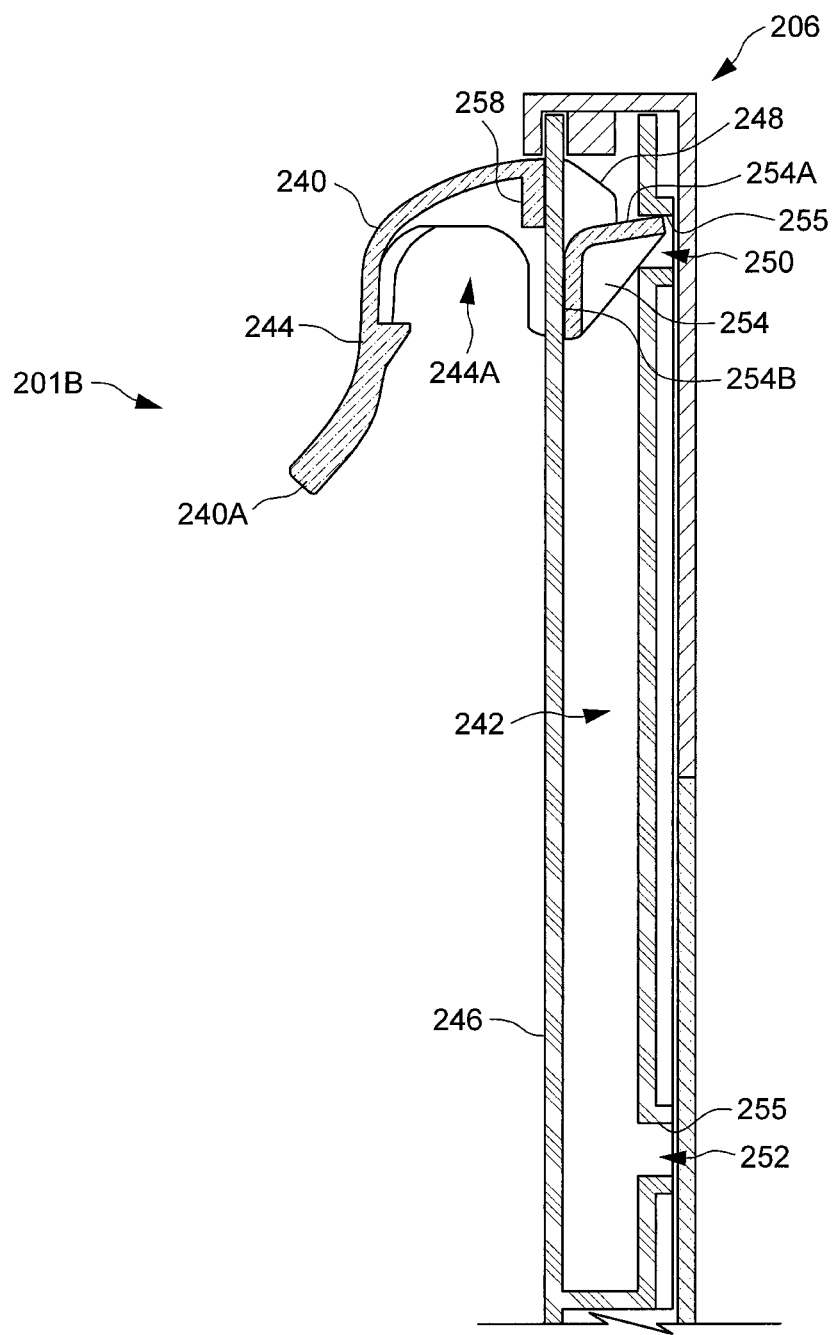
FIGS. 9 and 10 are cross-sectional views illustrating the playpen coupling mechanism of FIG. 8 in different states.
Figure 10:
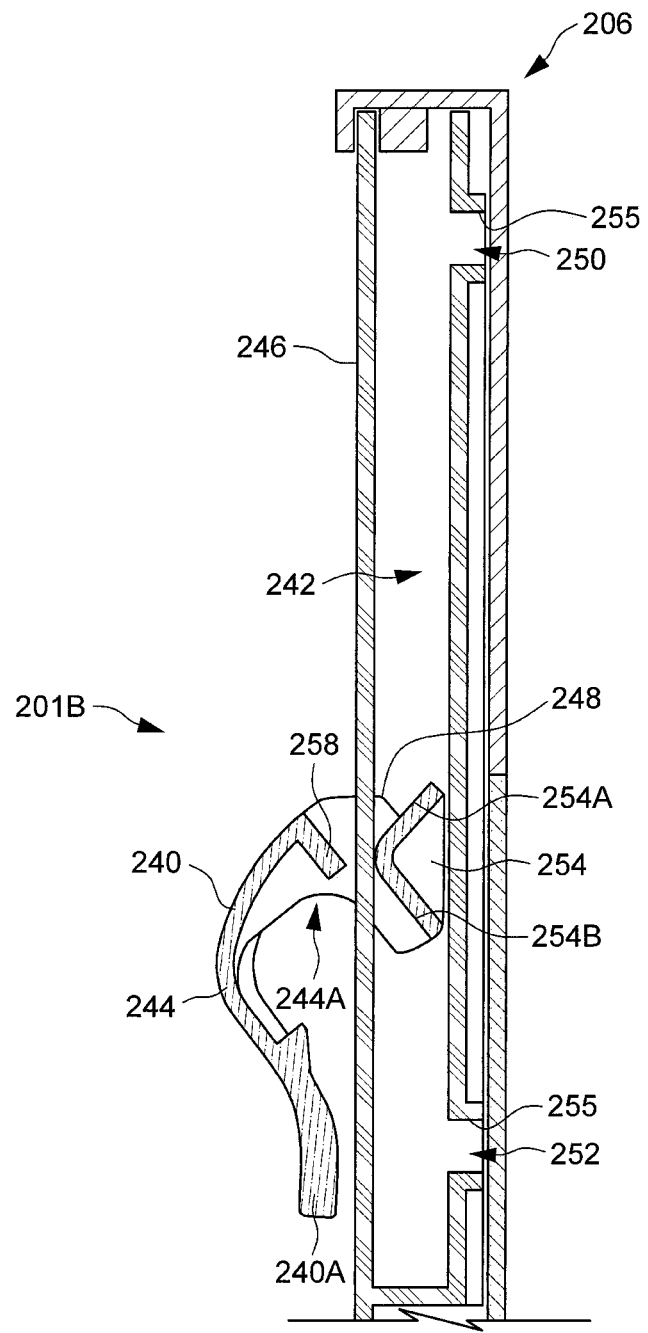

FIG. 8 is a perspective view illustrating another embodiment of a playpen coupling mechanism 201B provided on one upright frame portion 206 of the child bassinet 200 for installation of the child bassinet on a playpen at different elevations. FIGS. 9 and 10 are schematic cross-sectional views illustrating the playpen coupling mechanism 201B provided on the upright frame portion 206. The same structure illustrated in FIGS. 8-10 may be provided on each upright frame portion 206 of the child bassinet. Referring to FIGS. 8-10, the playpen coupling mechanism 201B can include an adjustable catching part 240 that can be positioned at different elevated positions on the upright frame portion 206. According to an embodiment, the catching part 240 can be connected with the upright frame portion 206 for upward and downward sliding movement along the upright frame portion 206. For example, the upright frame portion 206 can include a guide track 242 extending generally vertically, and the catching part 240 can slide along the guide track 242 relative to the upright frame portion 206. The catching part 240 can include an outer portion 244 protruding outward from a sidewall 246 of the upright frame portion 206, and an inner portion 248 received inside the guide track 242. According to an example of construction, the catching part 240 including the outer portion 244 and the inner portion 248 may be provided as a unitary part. The outer portion 244 can include a concavity 244A adapted to receive at least partially the upper frame portion 106A of the playpen 102 when the child bassinet is installed on the playpen 102.

Figure 11:
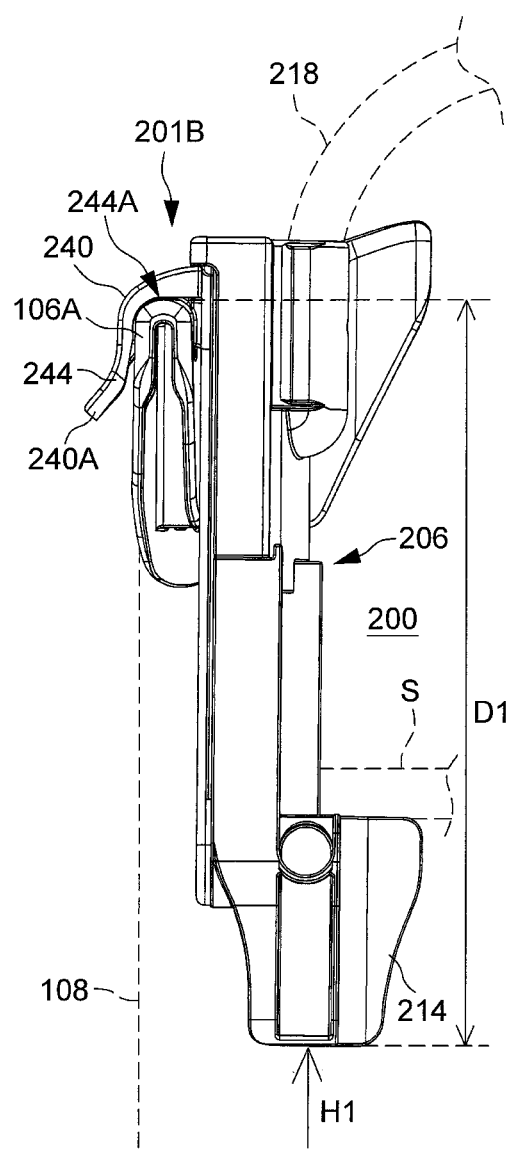
FIGS. 11 and 12 are schematic views illustrating a catching part of the playpen coupling mechanism shown in FIG. 8 in two different positions for installing the child bassinet at different heights on the upper frame portion of a playpen.
Figure 12:
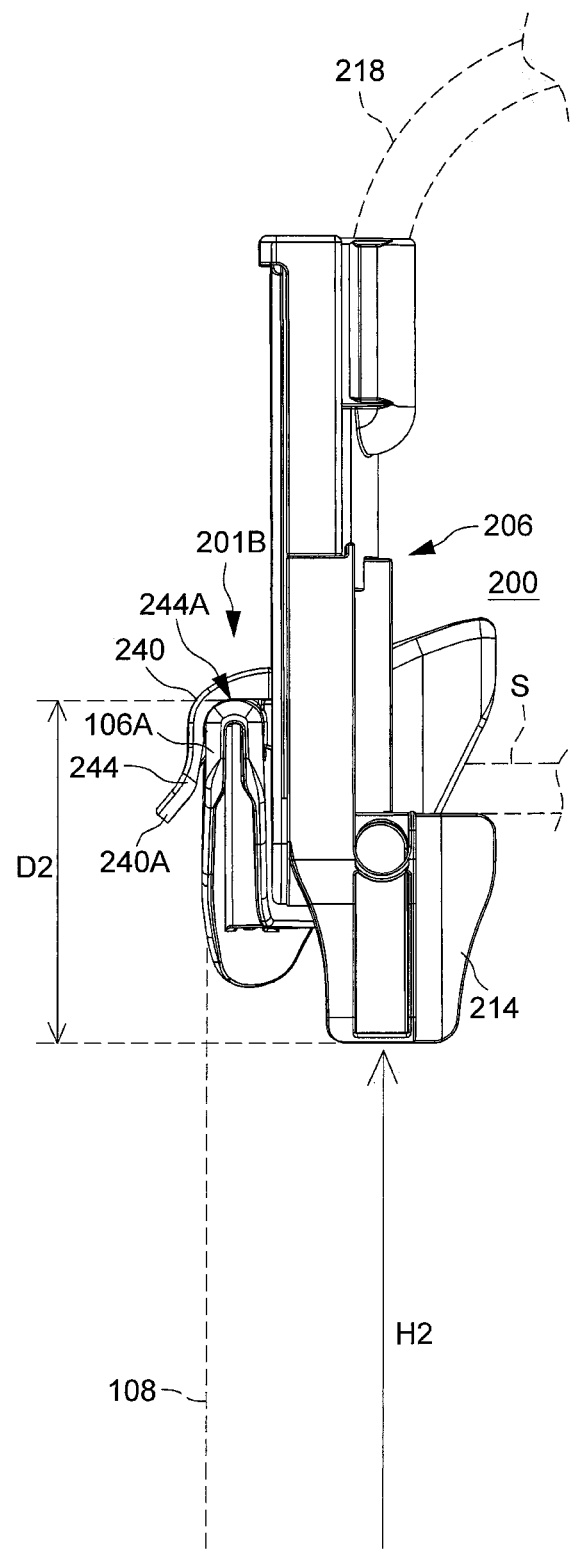

In conjunction with FIGS. 8-10, FIGS. 11 and 12 are schematic views illustrating two different positions of the catching part 240 on the upright frame portion 206 for installing the child bassinet at different heights on the upper frame portion 106A of a playpen. For clarity, only one upright frame portion 206 of the child bassinet 200 with its catching part 240 and a part of the upper frame portion 106A of the playpen are represented in FIGS. 11 and 12. Referring to FIGS. 8-12, the catching part 240 on each upright frame portion 206 can slide along the guide track 242 between at least two positions of different elevations relative to the foot 214. For example, when the catching part 240 is placed in a higher position relative to the foot 214 as shown in FIG. 11 (the catching part 240 in the higher position may be separated a first distance D1 from the foot 214), the catching part 240 can engage with the upper frame portion 106A of the playpen for installing the child bassinet 200 on the playpen at a first height H1 above the bottom of the playpen.

When the catching part 240 is placed in a lower position relative to the foot 214 as shown in FIG. 12 (the catching part 240 in the lower position may be separated a second distance D2 from the foot 214 that is smaller than the first distance D1 shown in FIG. 11), the catching part 240 can engage with the upper frame portion 106A of the playpen for installing the child bassinet 200 on the playpen at a second height H2 above the bottom of the playpen that is greater than the first height H1.

Referring to FIGS. 9 and 10, a latching mechanism may be provided to lock the catching part 240 on the upright frame portion 206 in the aforementioned positions of different elevations. According to an embodiment, this latching mechanism may include two openings 250 and 252 vertically distant from each other that are provided in the upright frame portion 206 adjacent to the guide track 242. The openings 250 and 252 may be fixedly provided in the upright frame portion 206, and the catching part 240 can be locked in the higher position on the upright frame portion 206 by engaging with the opening 250 and locked in the lower position on the upright frame portion 206 by engaging with the opening 252.

According to an embodiment, the catching part 240 is movable between a locking state where the inner portion 248 thereof can engage with the opening 250 or 252 to respectively lock the catching part 240 in the higher or lower position on the upright frame portion 206, and an unlocked state where the inner portion 248 of the catching part 240 is disengaged from the openings 250 and 252 for movement of the catching part 240 between the higher position and the lower position. FIG. 9 exemplary illustrates the catching part 240 engaged with the opening 250 and locked in the higher position, and FIG. 10 exemplary illustrates the catching part 240 in the unlocked state.

In the illustrated example of implementation, in addition to upward and downward sliding movements, the assembly of the catching part 240 with the upright frame portion 206 can further allow rotational movements of the catching part 240 in a vertical plane for facilitating its switching between the locked state and the unlocked state. According to another example of implementation, in addition to upward and downward sliding movements, the assembly of the catching part 240 with the upright frame portion 206 may further allow horizontal sliding movements of the catching part 240 for facilitating its switching between the locked state and the unlocked state.

Referring to FIGS. 9 and 10, an outer distal end 240A of the catching part 240 may move toward or away from the sidewall 246 of the upright frame portion 206 as the catching part 240 is switched between the locked state and the unlocked state. More specifically, the outer distal end 240A of the catching part 240 can be positioned adjacent to the sidewall 246 of the upright frame portion 206 to prevent access to the concavity 244A of the outer portion 244 when the catching part 240 is in the unlocked state (as shown in FIG. 10), whereby engagement of the catching part 240 with a playpen can be disabled. The outer distal end 240A can be displaced away from the sidewall 246 when the catching part 240 is moved from the unlocked state to the locked state, whereby access to the concavity 244A of the outer portion 244 is allowed for engagement of the catching part 240 with the upper frame portion 106A of the playpen 102. Accordingly, the child bassinet can be safer in use, as it cannot be installed on a playpen when the catching part 240 on each upright frame portion 206 is not locked in position.

Referring again to FIGS. 9 and 10, interference fit may be exemplary used to facilitate locking and unlocking of the catching part 240 on the upright frame portion 206. For example, when the catching part 240 is locked in place, two surfaces 254A and 254B of a shoulder portion 254 provided on the inner portion 248 of the catching part 240 can respectively engage with an upper surface 255 of the opening 250 or 252 and the inner side of the sidewall 246, and a rib 258 provided on the outer portion 244 of the catching part 240 can engage with the outer side of the sidewall 246.

Although the catching part 240 has been described as being slidably connected with the upright frame portion 206, it will be appreciated that another construction may allow the catching part 240 to be detached from the upright frame portion 206 for adjustment between the higher and lower positions. For example, when a caregiver wants to change the position of the catching part 240 on the upright frame portion 206, the catching part 240 can be detached from the upright frame portion 206 and then engaged with the opening 250 or 252 to be locked in a desirable position.

Figure 13:
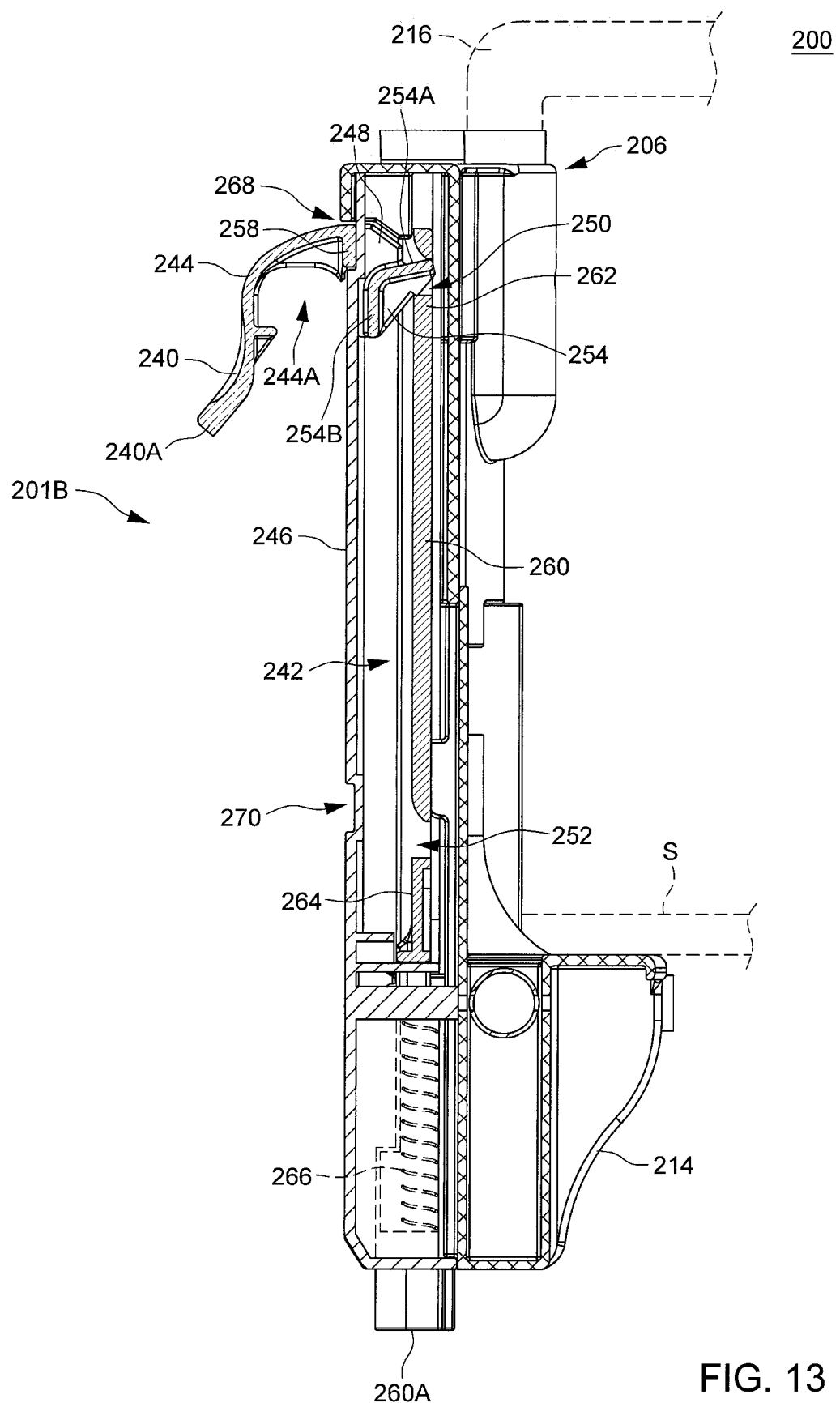
FIG. 13 is a cross-sectional view illustrating a variant construction of the playpen coupling mechanism shown in FIGS. 8-12.
Figure 14:
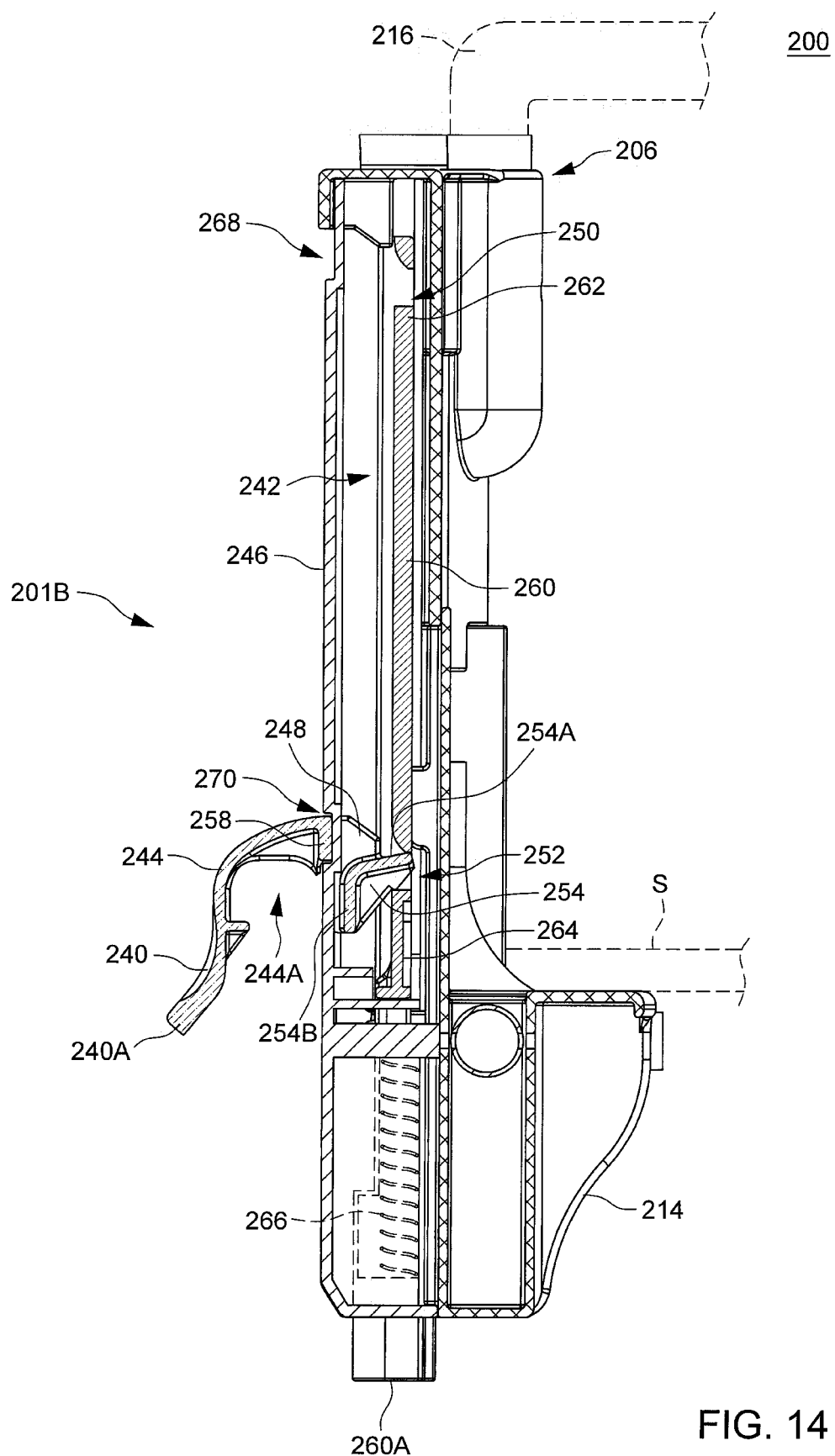
FIG. 14 is a cross-sectional view illustrating a catching part of the playpen coupling mechanism shown in FIG. 13 locked in a different position.
Figure 15:
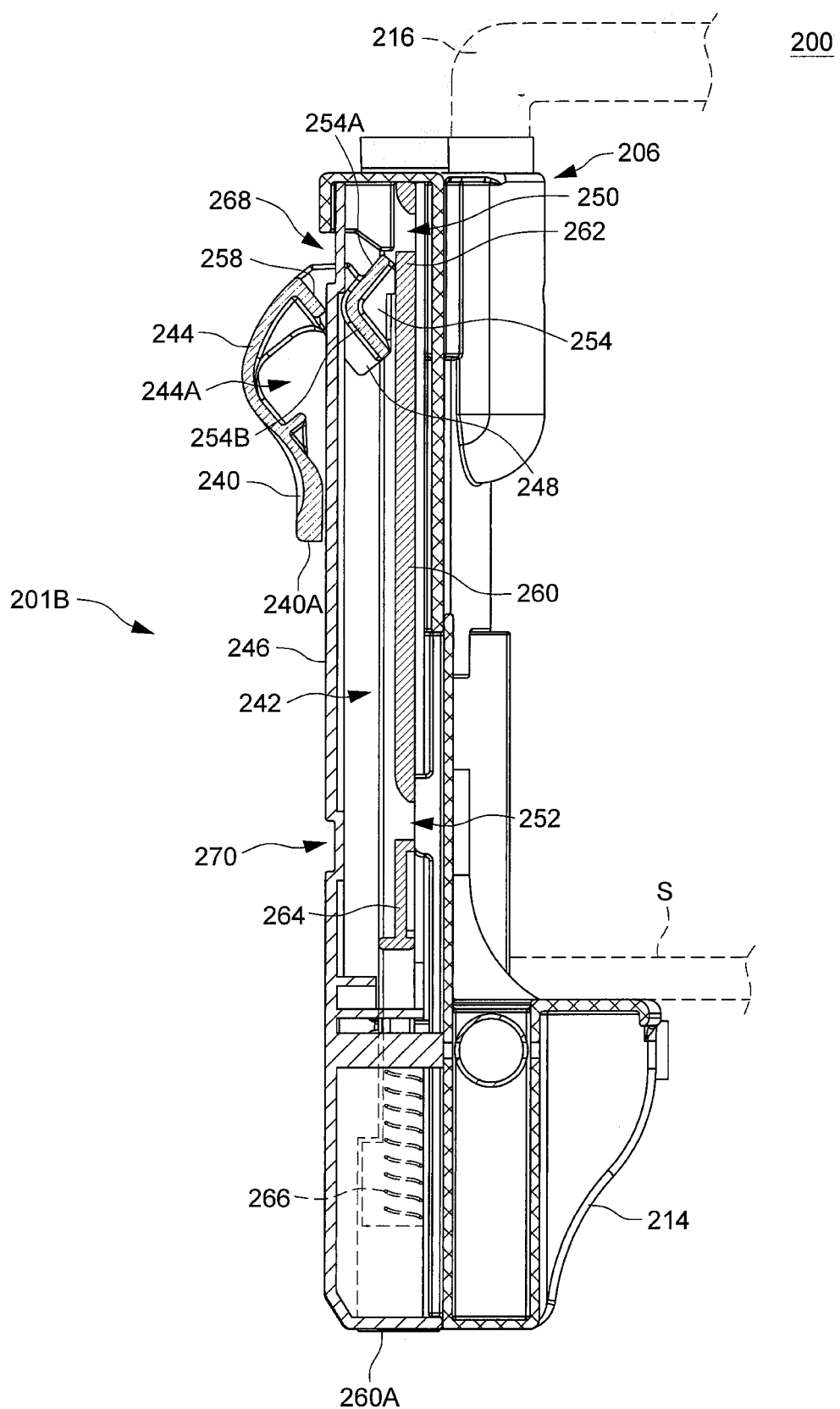
FIG. 15 is a cross-sectional view illustrating the playpen coupling mechanism of FIG. 13 in a lock disabling configuration.

FIGS. 13-15 are various views illustrating a variant embodiment of the playpen coupling mechanism 201B described previously in which the two openings 250 and 252 can be provided on a movable switching part 260 that is slidably assembled with the upright frame portion 206. The switching part 260 can have an elongate shape that extends along the guide track 242 to the foot 214 on the upright frame portion 206. Moreover, the switching part 260 can include two obstructing portions 262 and 264 respectively adjacent to the two openings 250 and 252.

The switching part 260 can move vertically relative to the upright frame portion 206 so as to change the respective positions of the openings 250 and 252 and obstructing portions 262 and 264 in the upright frame portion 206. More specifically, the switching part 260 is slidable relative to the upright frame portion 206 between a lock enabling position shown in FIGS. 13 and 14 allowing the catching part 240 to engage with any of the two openings 250 and 252, and a lock disabling position shown in FIG. 15 where engagement of the catching part 240 with the two openings 250 and 252 is prevented. In the lock enabling position, the two openings 250 and 252 can be respectively disposed at two predetermined positions corresponding to the higher and lower positions of the catching part 240 on the upright frame portion 206, thereby allowing the inner portion 248 of the catching part 240 to engage with any of the openings 250 and 252. According to an example of construction, the outer side of the sidewall 246 of the upright frame portion 206 may include two stop slots 268 and 270 respectively associated with the higher and lower positions of the catching part 240, and the two openings 250 and 252 can respectively overlap at least partially with the two stop slots 268 and 270 in the lock enabling position.

In the lock disabling position, the two openings 250 and 252 can be respectively displaced away from the aforementioned predetermined positions, and the two obstructing portions 262 and 264 can respectively overlap at least partially with the stop slots 268 and 270. As a result, the obstructing portions 262 and 264 can respectively block locking engagement of the catching part 240 in the higher and lower positions.

As shown in FIGS. 13-15, the switching part 260 can have a lower end 260A exposed outward at a bottom of the upright frame portion 206. The lower end 260A can protrude downward at the bottom of the upright frame portion 206 when the switching part 260 is in the lock enabling position (as shown in FIGS. 13 and 14), and displaced upward toward the upright frame portion 206 when the switching part 260 is in the lock disabling position (as shown in FIG. 15).

Referring to FIGS. 13-15, a spring 266 can have two opposite ends respectively connected with the switching part 260 and the upright frame portion 206. The spring 266 can bias the switching part 260 toward the lock enabling position.

When the child bassinet 200 is installed on the upper frame portion of a playpen, the switching part 260 on each upright frame portion 206 of the child bassinet can be in the lock enabling position, and the catching part 240 can be locked in the higher or lower position by engaging with the opening 250 or 252. FIG. 13 exemplary illustrates the catching part 240 engaged with the opening 250, and FIG. 14 exemplary illustrates the catching part 240 engaged with the opening 252.

When the child bassinet is removed from the playpen and used as a standalone device, a floor surface on which the upright frame portion 206 of the child bassinet stands can contact and push the lower end 260A of the switching part 260 upward toward the upright frame portion 206, whereby the switching part 260 can be displaced against the biasing action of the spring 266 from the lock enabling position to the lock disabling position shown in FIG. 15. As a result, the switching part 260 can push against the inner portion 248 of the catching part 240 and urge the catching part 240 to disengage from the opening 250 or 252, whereby the catching part 240 can turn from the locked state to the unlocked state. Like previously described, the outer distal end 240A of the catching part 240 can be positioned adjacent to the sidewall 246 of the upright frame portion 206 to prevent access to the concavity 244A of the outer portion 244 when the catching part 240 is in the unlocked state.

FIGS. 16-19 are various views illustrating another embodiment of a playpen coupling mechanism 201C provided on one upright frame portion 206 of the child bassinet 200 for installation of the child bassinet on a playpen at different elevations. Referring to FIGS. 16-19, the playpen coupling mechanism 201C can include an adjustable catching part 280 movably assembled with the upright frame portion 206. More specifically, the catching part 280 can be pivotally connected with the upright frame portion 206 about a substantially horizontal pivot axis 282. The catching part 280 can have two connecting surfaces 284 and 286 disposed offset from the pivot axis 282. For example, the catching part 280 can include an arm 288 and a knob 290 fixedly connected with each other, and the connecting surfaces 284 and 286 can be provided on the knob 290 respectively facing opposite directions. The arm 288 can be pivotally connected with the upright frame portion 206 about the pivot axis 282, and the knob 290 can be located at an eccentric position. According to an example of construction, the catching part 280, including the arm 288, the knob 290 and the connecting surfaces 284 and 286 may be formed integrally as a single part.

Figure 16:
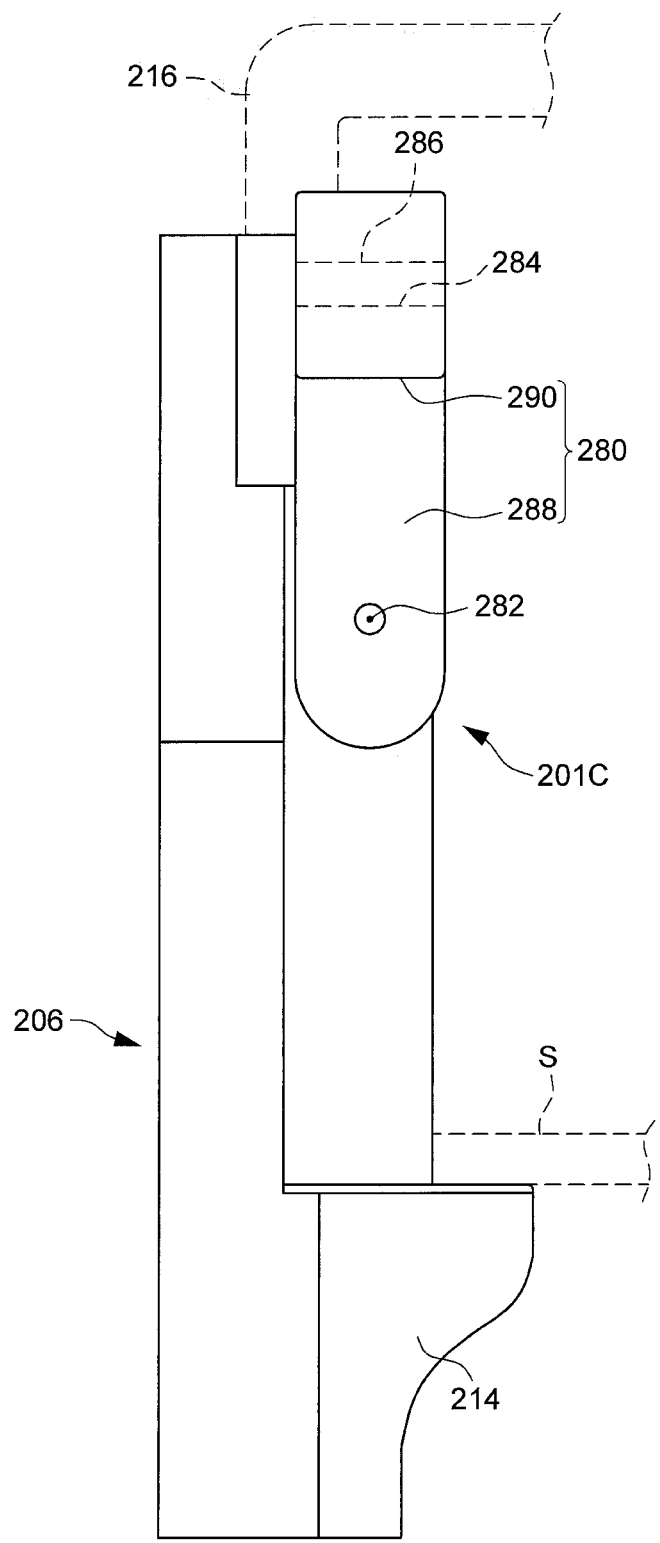
FIGS. 16-19 are various views illustrating another embodiment of a playpen coupling mechanism provided on one upright frame portion of a child bassinet for installation of the child bassinet on a playpen at different elevations.
Figure 17:
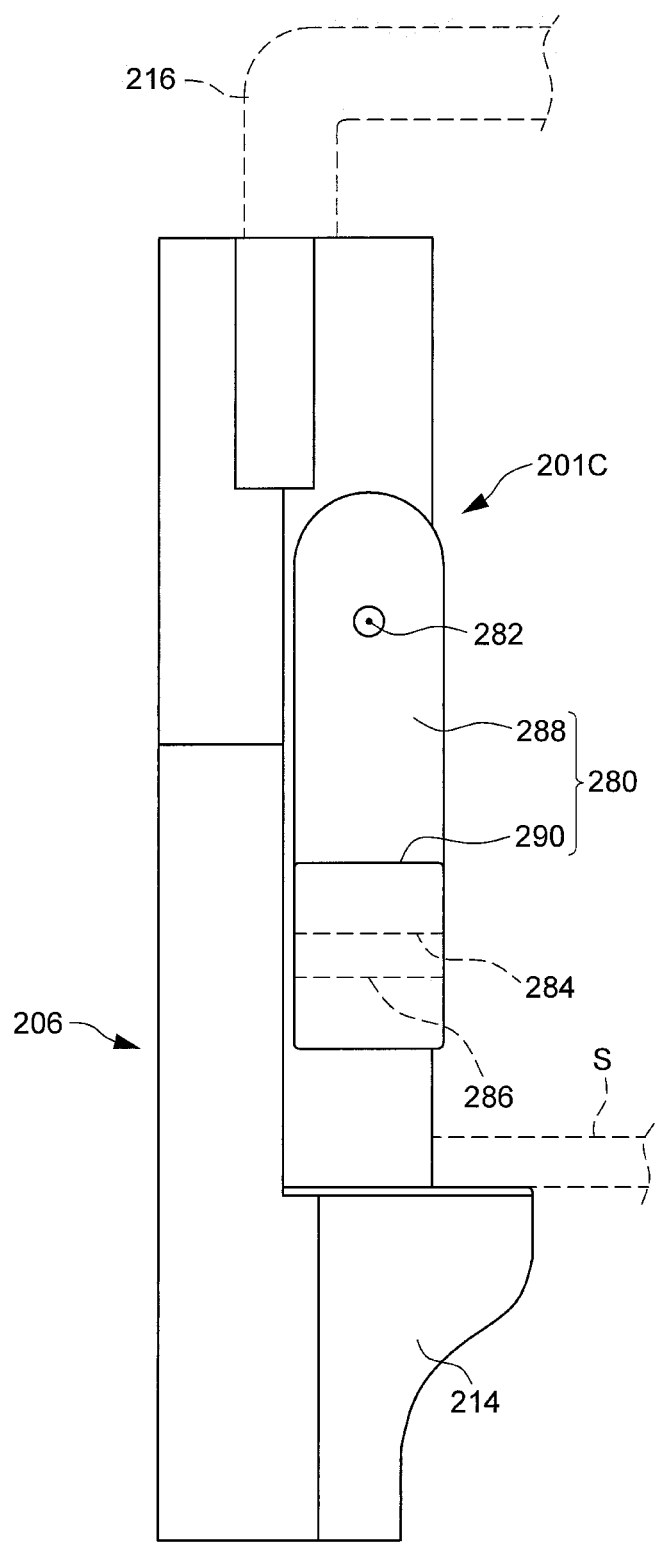
Figure 18:
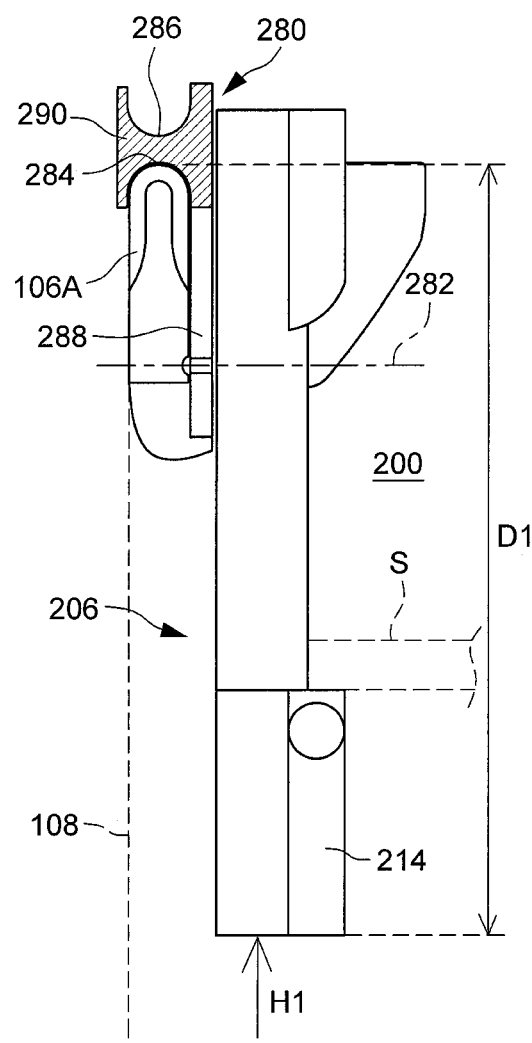

The catching part 280 on each upright frame portion 206 can rotate between at least two positions of different elevations shown in FIGS. 16 and 17. For example, when the catching part 240 is placed in the higher position shown in FIG. 16, the knob 290 can be positioned relatively higher, and the connecting surface 284 faces downward while the other connecting surface 286 can face upward. As schematically shown in FIG. 18, while the catching part 280 is in this higher position, the connecting surface 284 can be at a vertical distance D1 from the foot 214, and the child bassinet 200 can be installed on the playpen 102 at a first height H1 above the bottom of the playpen 102 with the connecting surface 284 engaging in contact with the upper frame portion 106A of the playpen 102.

Figure 19:
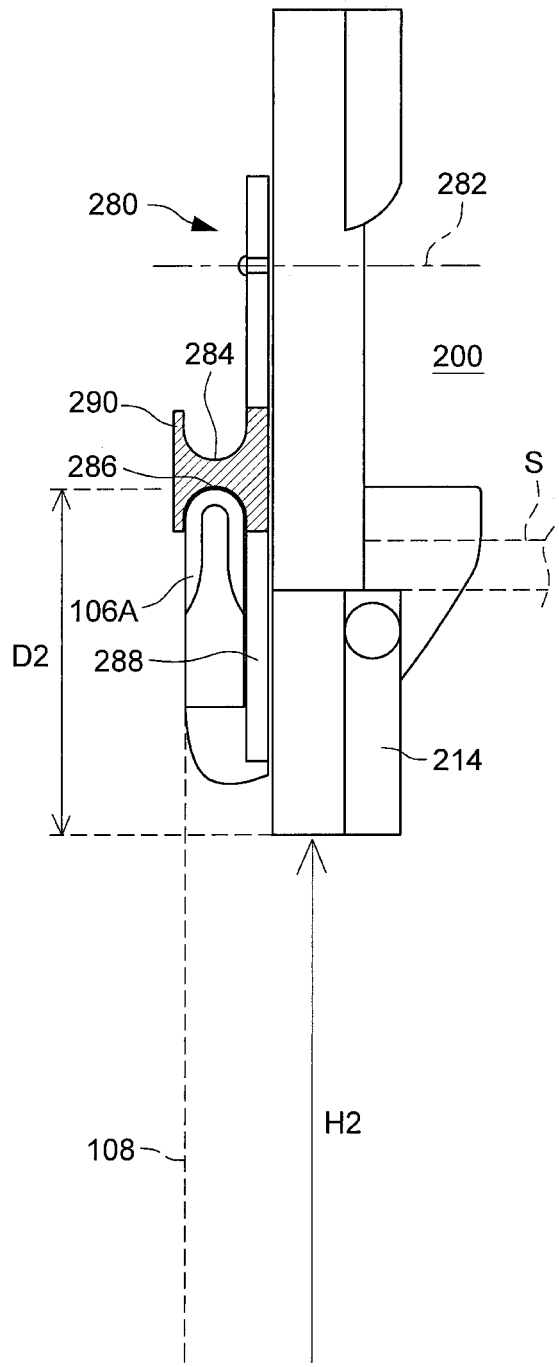

When the catching part 240 is placed in a lower position shown in FIG. 17, the knob 290 can be positioned relatively lower, and the connecting surface 286 faces downward while the connecting surface 284 can face upward. As schematically shown in FIG. 19, while the catching part 280 is in this lower position, the connecting surface 286 can be at a vertical distance D2 from the foot 214 that is smaller than the vertical distance D1, and the child bassinet 200 can be installed on the playpen at a second height H2 above the bottom of the playpen greater than the first height H1 with the connecting surface 286 engaging in contact with the upper frame portion 106A of the playpen.

Advantages of the structures described herein include a child bassinet that can be used independently as a standalone device or installed on a playpen. The child bassinet can include a playpen coupling mechanism that can be conveniently adjusted to accommodate the installation of the child bassinet at different elevations on the playpen.

Realization of the child bassinet and child care apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child bassinet comprising:
   a support frame supporting an enclosure, the support frame and the enclosure delimiting at least partially an interior space for receiving a child; and
   a playpen coupling mechanism provided on the support frame and operable to engage with and disengage from a playpen for installation and removal of the child bassinet on the playpen, the playpen coupling mechanism including an adjustable catching part movably connected with the support frame, the catching part being movable while connected to the support frame between a first position and a second position of different elevations relative to the support frame, the catching part in the first position being engageable with the playpen for installing the child bassinet on the playpen at a first height above a bottom of the playpen, and the catching part in the second position being engageable with the playpen for installing the child bassinet on the playpen at a second height above the bottom of the playpen that is different from the first height;

wherein the catching part while being adjacent to the first position or the second position is further movable relative to the support frame between a locked state where the catching part is in a locking engagement with the support frame for locking the catching part in the first position or the second position, and an unlocked state where the locking engagement between the catching part and the support frame is removed for movement of the catching part between the first and second position; and wherein the catching part when locked in the first position and the second position is supported at different vertical locations on the support frame.

2. The child bassinet according to claim 1, wherein the catching part is rotatable relative to the support frame between the locked state and the unlocked state.

3. The child bassinet according to claim 1, wherein the catching part has an outer portion protruding outward from a sidewall of the support frame, the outer portion of the catching part including a concavity adapted to receive at least partially an upper frame portion of the playpen for installing the child bassinet on the playpen.

4. The child bassinet according to claim 1, wherein the support frame includes a guide track along which the catching part is movable between the first and second position, and a first and a second opening adjacent to the guide track, the catching part being engaged with the first opening for locking the catching part in the first position or with the second opening for locking the catching part in the second position, and the catching part being disengaged from the first and second openings for movement of the catching part between the first and second position.

5. The child bassinet according to claim 4, wherein the first opening and the second opening are provided on a switching part that is movably assembled with the support frame, the switching part being slidable relative to the support frame between a lock disabling position preventing engagement of the catching part with the first and second openings, and a lock enabling position allowing engagement of the catching part with the first or second opening.

6. The child bassinet according to claim 5, wherein the switching part includes a first and a second obstructing portion respectively adjacent to the first and second opening, the first and second obstructing portions being positioned so as to block a locking engagement of the catching part when the switching part is in the lock disabling position.

7. The child bassinet according to claim 5, wherein the switching part has a lower end exposed outward at a bottom of the support frame, the lower end protruding at the bottom of the support frame in the lock enabling position, and when the child bassinet is used as a standalone device placed on a floor surface, the lower end of the switching part being pushed upward to the lock disabling position.

8. The child bassinet according to claim 1, wherein the catching part protrudes outward from a sidewall of the support frame, an outer distal end of the catching part being positioned adjacent to the sidewall of the support frame in the unlocked state for disabling engagement of the catching part with an upper frame portion of the playpen, and the outer distal end of the catching part being displaced away from the sidewall of the support frame in the locked state for engagement of the catching part with the upper frame portion of the playpen.

9. The child bassinet according to claim 8, wherein the catching part is assembled with an upright frame portion of the support frame provided at a corner thereof, and the sidewall is defined on the upright frame portion of the support frame.

10. A child care apparatus comprising:
a playpen having an upper frame portion; and
the child bassinet according to claim 1, installable on the upper frame portion of the playpen.

11. The child bassinet according to claim 1, wherein the playpen coupling mechanism further comprises the catching part in the first position being engageable with an upper frame portion of the playpen, and the catching part in the second position being engageable with the upper frame portion of the playpen.

12. The child bassinet according to claim 1, wherein the support frame includes a guide track along which the catching part is movable between the first and second position.

13. A child bassinet comprising:
a support frame supporting an enclosure, the support frame and the enclosure delimiting at least partially an interior space for receiving a child; and
a playpen coupling mechanism provided on the support frame and operable to engage with and disengage from a playpen for installation and removal of the child bassinet on the playpen, the playpen coupling mechanism including an adjustable catching part slidably connected with the support frame, the catching part being vertically slidable relative to the support frame between a first position and a second position of different vertical elevations, the catching part in the first position being engageable with the playpen for installing the child bassinet on the playpen at a first height above a bottom of the playpen, and the catching part in the second position being engageable with the playpen for installing the child bassinet on the playpen at a second height above the bottom of the playpen that is different from the first height;

wherein the catching part is further movable relative to the support frame between a locked state where the catching part is in a locking engagement with the support frame for locking the catching part in the first position or the second position, and an unlocked state where the locking engagement between the catching part and the support frame is removed for movement of the catching part between the first and second position.

14. A child bassinet comprising:
a support frame supporting an enclosure, the support frame and the enclosure delimiting at least partially an interior space for receiving a child; and
a playpen coupling mechanism provided on the support frame and operable to engage with and disengage from a playpen for installation and removal of the child bassinet on the playpen, the playpen coupling mechanism including an adjustable catching part movably connected with the support frame, the catching part being movable relative to the support frame between a first position and a second position of different elevations, the catching part in the first position being engageable with the playpen for installing the child bassinet on the playpen at a first height above a bottom of the playpen, and the catching part in the second position being engageable with the playpen for installing the child bassinet on the playpen at a second height above the bottom of the playpen that is different from the first height;

wherein the support frame includes a guide track along which the catching part is movable between the first and second position;

wherein the catching part is further movable relative to the support frame between a locked state where the catching part is in a locking engagement with the support frame for locking the catching part in the first position or the second position, and an unlocked state where the locking engagement between the catching part and the support frame is removed for movement of the catching part between the first and second position.

15. The child bassinet according to claim 14, wherein the catching part is movable relative to the support frame while connected to the support frame between the first position and the second position, the first position and the second position being of different elevations relative to the support frame.

\* \* \* \* \*